United States Patent [19]

Marnett et al.

[11] 4,164,593

[45] Aug. 14, 1979

[54] ANTI-CAKING DOUGH CONDITIONING COMPOSITION AND METHOD

[75] Inventors: Lawrence F. Marnett, Leawood, Kans.; Veryl D. Barry, Independence, Mo.

[73] Assignee: C. J. Patterson Company, Kansas City, Mo.

[21] Appl. No.: 783,658

[22] Filed: Apr. 1, 1977

[51] Int. Cl.² ............................................. A21D 2/16
[52] U.S. Cl. ...................................... 426/653; 426/24
[58] Field of Search .......................... 426/653, 24, 62; 260/410 R

[56] References Cited

U.S. PATENT DOCUMENTS

| | | | |
|---|---|---|---|
| 2,733,252 | 1/1956 | Thompson et al. | 260/410 R |
| 3,033,686 | 5/1962 | Landfried et al. | 426/653 X |
| 3,876,805 | 4/1975 | Craig et al. | 426/653 X |

*Primary Examiner*—Raymond N. Jones
*Assistant Examiner*—Esther M. Kepplinger

*Attorney, Agent, or Firm*—Schmidt, Johnson, Hovey & Williams

[57] ABSTRACT

An anti-caking, powdered, combined-salt dough conditioning agent, along with a method of producing the same, is provided which effectively resists caking or agglomeration even when stored under adverse ambient conditions for relatively long periods, so that the agent remains usable as a free-flowing powder for commercial baking purposes. The agent includes respective quantities of calcium and sodium salts of the acyl lactylates of $C_{14}$–$C_{22}$ fatty acids which have been commingled in a molten condition and thereafter cooled to the solid state and ground. In particularly preferred forms, amounts of CSL and SSL are admixed as dry powders and co-heated to melt the same, followed by thorough mixing and cooling of the salts to a grindable solid. Other additives, such as mono-and diglycerides and derivatives thereof, can also be used in conjunction with the defined sodium and calcium salts to yield combined additives having excellent anti-caking properties.

26 Claims, No Drawings

ANTI-CAKING DOUGH CONDITIONING COMPOSITION AND METHOD

This invention relates to dry, powdered, combined-salt dough conditioning agents which are exceptionally resistant to caking or agglomeration during storage thereof. More particularly, it is concerned with agents of this type which include respective quantities of sodium and calcium salts of the acyl lactylates of $C_{14}$–$C_{22}$ fatty acids (preferably SSL and CSL) which have been commingled in a molten condition and thereafter cooled to a solid state. Optionally, other known dough improvers such as mono-and diglycerides and derivatives thereof can also be used in the additives. The additives hereof synergistically resist the tendency to lump or agglomerate, and remain in a free-flowing powder or granular condition over relatively long periods of time. Moreover, baking tests using the additives of the invention demonstrate that organoleptic properties of resultant baked goods are maintained or even enhanced, as compared with baked goods prepared with conventional additives.

Fatty acid lactylates such as calcium or sodium stearoyl-2-lactylate have been employed in bread doughs for a number of years to improve the quality thereof. The specifications for sodium stearoyl-2 lactylate (SSL) are set forth in Food Additive Regulations 21 CFR, Section 121.1211, while similar specifications for calcium stearoyl-2-lactylate (CSL) are found at Section 121.1047 of the same Regulations. SSL is a mixture of sodium salts of stearoyl lactylic acids and minor proportions of other sodium salts of related acids and is manufactured by the reaction of stearic acid and lactic acid followed by conversion to the sodium salts. CSL is prepared in a similar manner but comprises the calcium salts of stearoyl lactylic acids. In general, the dough conditioning properties of such fatty acid lactylates serve to enhance mixing tolerance of doughs, while increasing loaf volumes, improving the texture of the finished baked goods, and in general producing final products of improved taste and appearance characteristics.

It has also been known to employ combined additives which include fatty acid lactylates along with ethoxylated monoglycerides. For example, in U.S. Pat. No. 3,870,799, dough conditioning and softening agents are described which include fatty acid lactylates and ethoxylated mono-and diglycerides of fatty acids. Such combined additives have proven to be very advantageous when incorporated into bread doughs and the like.

Although the use of SSL and CSL either alone or in combination is well established, a number of problems remain. Specifically, both of these additives have a tendency to lump or agglomerate during storage and shipping thereof, either alone or in a combined additive. This stems from the inherent tendency of the materials to agglomerate, and is aggravated when the materials are subjected to relatively warm temperature and humidity conditions such as those encountered during shipping or storage in warehouse or in a commercial bakery. Furthermore, if bulk packages of SSL or CSL are opened and exposed to the atmosphere for extended periods, there is an even increased tendency towards caking. In general, caking is dependent both upon time of storage as well as ambient temperature conditions; short-time, high temperature storage will cause caking, as well as storage over longer periods at somewhat lower temperatures.

Although the functional properties of SSL and CSL and combination additives containing the same are generally not affected by caking, as a practical matter this presents real problems for commercial bakers. Either the shipping and storage conditions for the additives must be carefully controlled to prevent lumping, or separate grinding equipment must be maintained for regrinding the caked SSL or CSL to its original particle size. As can be appreciated, both of these alternatives can represent a significant cost and inconvenience to commercial bakeries. Of course, any other solution to the caking problem cannot be such as to substantially inhibit or destroy the dough conditioning and softening properties of the additives.

Background information somewhat pertinent to SSL and CSL additives, and the present invention, can be found in U.S. Pat. No. 3,033,686, Methods of Producing Soy-Fortified Breads, *Cereal Science Today*, Vol. 18, No. 2, p. 38ff., The Role of Emulsifiers and Dough Conditioners in Foods, *Food Product Development*, October 1973, and Sodium Stearoyl-2-lactylate, *Bakers Digest*, Vol. 42, No. 6, pp. 38–42.

It is therefore the most important object of the present invention to provide a fatty acid lactylate dough conditioning and softening agent which is substantially resistant to caking or agglomeration even when stored under adverse ambient conditions or for relatively long periods of time, and which is effective for enhancing the desirable organoleptic properties of finished baked goods.

As a corollary to the foregoing, another object of the invention is to provide a combined salt additive which includes respective quantities of sodium and calcium salts of the acyl lactylates of $C_{14}$–$C_{22}$ fatty acids which have been commingled in a molten condition and thereafter cooled to a solid state; in preferred form the respective salts are admixed in a dry condition, coheated to melt the salts, and cooled. In alternate forms the respective salts can be synthesized together in a common vessel under conditions to effect the necessary commingling of the molten salts. Other additives such as mono-and diglycerides and derivatives thereof can be used with the basic combined salt additive.

A still further object of the invention is to provide a combined-salt additive which comprises respective quantities of SSL and CSL, with the calcium salt being present in an amount at least equal to the amount of the sodium salt; in the most preferred forms, the calcium salt is present at a level of from about 50 to 85% by weight, and the sodium salt is correspondingly present at a level of from about 15 to 50% by weight, both of the levels being based upon a combined weight of the calcium and sodium salt taken as 100%.

In its broadest form, the present invention is concerned with anti-caking dough conditioning agents which combine respective quantities of (1) a sodium salt of at least one of the acyl lactylates of $C_{14}$–$C_{22}$ fatty acids, and (2) a calcium salt of at least one of the acyl lactylates of $C_{14}$–$C_{22}$ fatty acids. These salts are commingled in a molten condition using essentially any feasible means and thereafter cooled to provide a solid which can be ground or otherwise treated by conventional equipment to provide a powdered product which is substantially resistant to caking or agglomeration.

In more detail, the dough conditioning agents hereof should broadly include from about 10 to 85% of the calcium salt, and correspondingly from about 15 to 90% of the sodium salt (the combined weight of sodium salt and calcium salt taken as 100%). In preferred forms the amount of calcium salt should be at least equal to the amount of sodium salt used. For example, the calcium salt may comprise from 50 to 85% by weight (most preferably 65 to 80% by weight), with the fraction of the additive made up of calcium salts and sodium salts taken as 100%. Correspondingly, the sodium salts should be present at a level of from 15 to 50% by weight (most preferably, 20 to 35% by weight) on the same basis.

In other forms, an improved, primarily sodium salt product will result through the use of from 10 to 40% by weight calcium salts (preferably from about 20 to 30% by weight), as compared with from about 60 to 90% by weight sodium salts (preferably about 70 to 80% by weight). Again these figures are based on the total weight of the sodium salts and calcium salts taken as 100%. For example, it is known that SSL has greater bread softening capabilities than CSL, but the latter has a better resistance to caking; in keeping with the present invention, it has been found that relatively small amounts of CSL can improve the anti-caking characteristics of SSL without substantially reducing the bread softening properties thereof.

It has also been discovered that other dough improvers such as mono-and diglycerides and derivatives thereof can be used and incorporated with the basic calcium salt-sodium salt additive described above. In such cases, the additional improvers can be used at levels up to about 75% by weight, based upon the weight of the overall combined additive. More preferably, the additional improvers can be present at a level of from about 15 to 60% by weight.

The most preferred salts for use in the present invention are, respectively, calcium stearoyl-2-lactylate and sodium stearoyl-2-lactylate. Specific procedures for producing these lactylates (in which the number 2 indicates the average number of lactyl groups on the molecule) are set forth in detail in U.S. Pat. Nos. 2,789,992 and 2,733,252. These patents, insofar as the disclosures thereof are relevant to the production of the preferred lactylates, are expressly incorporated herein by reference. In general however, SSL and CSL products are synthesized by reacting stearic acid and lactylic acid, with neutralization to the sodium or calcium salts. Specific procedures for producing fatty acid lactylates using other types of fatty acids (e.g. palmitic) are also well known and need not be detailed herein.

The preferred method of producing the agents hereof involves initially admixing the sodium and calcium salts in their powdered or solid form, followed by coheating the salts for melting thereof. In the case of SSL and CSL, the admixture can be most easily melted in a water bath maintained at a temperature of about 95° C. In any event, after the salts are melted they are thoroughly admixed and commingled, whereupon the combined-salt admixture is allowed to cool and solidify. In actual production procedures, the product would then be treated by conventional means to yield a powdered product. This may, for example, involve solidifying the molten product with a flaking roll, followed by grinding in a hammer mill and screening to eliminate large lumps, or spray cooling from the molten form to solid particles. Alternately, respective quantities of the molten salts can be transferred from individual bulk holding tanks thereof to a blending vessel for the needed commingling. For example, this procedure may be advantageous during processing since the salts are conventionally held in a molten condition in such tanks after the synthesis thereof.

In alternative forms, the agents hereof can be produced by simultaneously synthesizing the desired sodium and calcium salts in a common vessel. In the case of SSL and CSL, appropriate quantities of stearic and lactylic acids would be allowed to react in a vessel under the usual conditions, whereupon respective amounts of sodium and calcium neutralizing agents would be added in order to give the corresponding sodium and calcium combined salt product. This reaction would proceed under conditions assuring commingling of the synthesized salts in their molten condition, so that the conditions of the present invention are satisfied. The remaining steps are identical with that of the preferred embodiment, i.e., cooling of the commingled salts followed by treatment thereof to present a free-flowing powder.

As noted, other bread improvers such as mono-and di-glycerides and derivatives thereof (e.g., succinylated mono-glycerides) can be used in the basic sodium salt-calcium salt additive hereof. These are generally produced by commingling the additional improvers with the sodium and calcium salts, with all ingredients being in a molten condition. Any suitable technique for effecting such commingling in a molten condition would be usable. As before, the combined product would, after the commingling step, be solidified and subdivided.

In practice, the agents of the invention have demonstrated substantial resistance to caking or agglomeration. This is especially surprising since simple powdered admixtures of sodium and calcium salts, without commingling thereof in a molten condition, are known to be subject to extensive caking, and are therefore undesirable from this standpoint. Thus, it was extremely surprising to find that commingling of the salts in a melted condition as described herein yielded dough additives which are very resistant to caking.

Moreover, the functionality of the additives hereof is such that no appreciable loss of desirable properties occurs. In fact, certain organoleptic properties such as softness and loaf volume may even be enhanced through the use of the present additives, as compared with those of the prior art.

The following Examples will illustrate specific methods for producing the additives hereof as well as their functionality in terms of resistance to caking and enhancement of desirable properties in finished baked goods. However, nothing in these examples is intended to limit the present invention.

EXAMPLE I

In order to demonstrate the anti-caking properties of the combined salt compositions of the present invention, the following tests were undertaken.

Equal portions (approximately 1 pound each) of seven samples of powdered CSL were blended together to form a master blend of powdered CSL. A similar method was followed to prepare a master blend of powdered SSL. Test samples were compounded from the respective master blends of CSL and SSL to produce the following test blends:

TABLE I

| Test Blend No. | % CSL | % SSL |
|---|---|---|
| 1 | 100 | -0- |
| 2 | 85 | 15 |
| 3 | 75 | 25 |

TABLE I-continued

| Test Blend No. | % CSL | % SSL |
|---|---|---|
| 4 | 65 | 35 |
| 5 | 50 | 50 |
| 6 | 25 | 75 |
| 7 | -0- | 100 |

Four hundred (400) grams of each test blend was next melted in a water bath maintained at 95° C. As each test blend was melted it was stirred with a glass rod to thoroughly mix and commingle the components without incorporating large amounts of air. After stirring each test blend was poured into a shallow aluminum foil dish to cool. At the point at which the material solidified on the surface, the foil container was placed inside a moisture resistant plastic bag and allowed to cool overnight.

After cooling overnight each test blend was ground in a hand operated food grinder and screened. Care was taken to minimize absorption of ambient humidity and heat of friction. Duplicate samples were prepared from the ground material, and the latter was passed through a 60 mesh screen and retained on a 140 mesh screen. Twenty five (25) grams of the screened material was then sealed in 4 ounce jars with bakelite lids. Sample jars were placed in a constant temperature cabinet maintained at 38° C.

The storage samples were examined daily for the first week and thereafter twice weekly until it was determined there were no significant changes in the material between examination periods. Each examination consisted of carefully probing through the surface of the test material with a small spade shaped stainless steel spatula and digging in a small area to determine the tendency to clump. A scale of 0 to 10 was used to rate the samples, with 0 corresponding to a completely free-flowing powder and 10 representing a fairly solid mass which did not crumble with moderate pressure.

Each examination was performed by two or more individuals and the results averaged. The rating of each sample's tendency to agglomerate is shown in the following table. By virtue of the ambient conditions maintained during the test period, caking is accelerated, and seemingly small relative differences in test results are significant:

TABLE II

| Test Blend No. | Elapsed Storage Time In Days | | | | | | | | | |
|---|---|---|---|---|---|---|---|---|---|---|
| | 1 | 2 | 3 | 4 | 7 | 9 | 11 | 14 | 17 | 31 | 220 |
| 1 | 0 | 0 | 1 | 1 | 3 | 3 | 4 | 4 | 6 | 10+ | 10 |
| 2 | 0 | 0 | 0 | 1 | 1 | 1 | 1 | 2 | 2 | 6 | 10 |
| 3 | 0 | 0 | 0 | 1 | 1 | 1 | 1 | 1 | 2 | 3 | 9 |
| 4 | 0 | 0 | 2 | 1 | 2 | 3 | 2 | 2 | 3 | 4 | 7 |
| 5 | 1 | 1 | 2 | 3 | 3 | 4 | 3 | 4 | 4 | 8 | 9 |
| 6 | 2 | 2 | 3 | 4 | 6 | 7 | 7 | 8 | 8 | 10+ | 10 |
| 7 | 3 | 3 | 5 | 6 | 7 | 8 | 8 | 8 | 9 | 10++ | 10(5+) |

Additional test samples were prepared from a master blend of CSL (consisting of equal portions of six separate batches) and a master blend of SSL (consisting of four separate batches). The test samples were compounded as follows:

TABLE III

| Test Blend No. | % CSL | % SSL |
|---|---|---|
| 8 | 100 | -0- |
| 9 | 90 | 10 |
| 10 | 80 | 20 |

TABLE III-continued

| Test Blend No. | % CSL | % SSL |
|---|---|---|
| 11 | 70 | 30 |
| 12 | 60 | 40 |
| 13 | 50 | 50 |
| 14 | -0- | 100 |

The test samples were prepared in a similar manner to those discussed above except that the material was screened through 60 mesh screen and retained on a 200 mesh screen. The rating of each sample's tendency to agglomerate is shown in the following table:

TABLE IV

| Test Sample No. | Elapsed Storage Time in Days | | | | | | | | | |
|---|---|---|---|---|---|---|---|---|---|---|
| | 3 | 5 | 10 | 12 | 14 | 19 | 24 | 34 | 37 | 205 |
| 8 | 1 | 1 | 2 | 2 | 1 | 2 | 2 | 4 | 4 | 9 |
| 9 | 1 | 1 | 2 | 2 | 2 | 3 | 3 | 5 | 4 | 9 |
| 10 | 1 | 1 | 3 | 2 | 2 | 3 | 3 | 5 | 4 | 4 |
| 11 | 1 | 2 | 4 | 2 | 3 | 3 | 4 | 4 | 3 | 4 |
| 12 | 2 | 2 | 5 | 3 | 4 | 4 | 4 | 6 | 4 | 5 |
| 13 | 3 | 3 | 5 | 5 | 5 | 6 | 6 | 8 | 6 | 8 |
| 14 | 4 | 6 | 7 | 8 | 9 | 10 | 10 | 10++ | 10++ | 10(4+) |

EXAMPLE II

In order to determine the usefulness of a simple dry blend of powdered CSL and SSL, the following experiment was performed.

A master blend of CSL was made by admixing equal quantities of powdered CSL from separate samples; similarly, a master blend of SSL was made using two separate powdered SSL samples.

These master blends were then used to form powdered blends. In each case the respective powders were dry blended and thoroughly admixed. The blends were then screened through a 60 mesh screen and retained on a 200 mesh screen so that the samples were uniform. The composition of the respective blends are set forth below:

TABLE V

| Blend No. | CSL % | SSL % |
|---|---|---|
| 15 | 100 | — |
| 16 | 90 | 10 |
| 17 | 80 | 20 |
| 18 | 70 | 30 |
| 19 | 60 | 40 |
| 20 | 50 | 50 |
| 21 | 40 | 60 |
| 22 | 25 | 75 |
| 23 | — | 100 |

The blends were then packaged, stored and scored in the manner specified in the foregoing example. The results of this testing are set forth in the following table:

TABLE VI

| Test Sample | Elapsed Storage Time in Days | | | |
|---|---|---|---|---|
| | 5 | 10 | 17 | 35 |
| 15 | 3 | 3 | 4 | 6 |
| 16 | 3 | 4 | 5 | 7 |
| 17 | 5 | 5 | 6 | 7 |
| 18 | 5 | 6 | 7 | 8 |
| 19 | 4 | 7 | 8 | 9 |
| 20 | 5 | 8 | 9 | 10 |
| 21 | 6 | 9 | 10 | 10+ |
| 22 | 7 | 10 | 10+ | 10+++ |

TABLE VI-continued

| Test Sample | Elapsed Storage Time in Days | | | |
|---|---|---|---|---|
| | 5 | 10 | 17 | 35 |
| 23 | 8 | 10+ | 10++ | 10(4+) |

A review of the above results will demonstrate that simple dry admixing of the SSL and CSL in their powdered form does not effectively decrease the tendency to cake or agglomerate, and that the caking characteristics of the powdered blends were entirely predictable from the known properties of SSL and CSL individually. A comparison with the results of Example I will further demonstrate that commingling of the respective salts in a melted condition, followed by cooling to form a solid, synergistically enhances the resistance to caking of the combined CSL-SSL compositions.

EXAMPLE III

The efficacy of the combined salt additives of the present invention as dough conditioners and loaf volume enhancers was tested in the following experiment.

Baking tests were carried out in accordance with a standardized sponge-dough test protocol to yield loaves having various additives therein. In general, the procedure was as follows.

The sponge formula was as set forth in the table below:

TABLE VII

| | SPONGE | |
|---|---|---|
| Ingredients | Grams | Percentage Based on Total Flour |
| Bakers Patent Flour | 490 | 70.0 |
| Water | 294 | 42.00 |
| Yeast (Compressed) | 17.5 | 2.50 |
| Yeast Food (Arkady) | 5.25 | 0.75 |
| Shortening | 14 | 2.00 |

The yeast was pre-soaked for thirty (30) minutes in a part of the sponge water, at 80° F., to form a suspension. This suspension and the balance of the water were added to the other sponge ingredients and mixed three (3) minutes at 44 RPM using a Hobart A-200 mixer equipped with a Model CT-W-200 bowl and fork (National Manufacturing Company). The bowl was water jacketed for temperature control and was an improved version of the McDuffe bowl. The sponge was set at 78° F., transferred to a trough (10⅝×5 inches inside, 10½×4½ inches bottom outside and 5 inches deep) and fermented for 4½ hours in a cabinet maintained at 83° F. and 80% relative humidity.

The dough had the following formula:

TABLE VIII

| | DOUGH | |
|---|---|---|
| Ingredients | Grams | Percentage Based on Total Flour |
| Bakers Patent Flour | 210 | 30.00 |
| Water (Farinograph + 2.0%)[1] | 133 – 168 | 61.0 – 66.0 |
| Sugar (Dextrose) | 49 | 7.00 |
| Salt | 14 | 2.00 |

[1] Absorption variations are due to variable requirements of flours, determined by the Farinograph.

The dough ingredients were added to the fermented sponge and mixed two (2) minutes at 44 RPM, fully developed at 88 RPM and set at 80° F. The mixing equipment was the same as specified for the sponge. The time of the development stage of mixing depended on the mixing requirements of the flour, determined from the Farinograph peak time and was approximately eight minutes in this instance. The developed dough was then returned to the trough and given 45 minutes floor time in a cabinet maintained at 83° F. and 80% relative humidity. The dough was then hand scaled into 19-ounce dough pieces, mechanically rounded in a conventional type rounder and placed in a cabinet drawer for ten minutes to simulate conventional overhead proof. After overhead time, the dough pieces were hand flattened as a pre-sheeting operation and moulded on a conventional type, cross grain moulder. The moulder head rolls were set for 0.429 inch clearance between the top rolls and 0.127 inch clearance between the bottom rolls. The dough pieces were then placed in one pound bread pans having a pan factor of 2.25 square inches to an ounce of dough. The pans measured 10¼×4⅝ inches top inside, 9½×3⅞ inches bottom outside and 3 inches deep.

The panned dough was proofed to volume, as determined by a gauge, ½ inch above the top of the pans, in a cabinet maintained at 105° F. and 87% relative humidity. After final proof the panned dough was baked in a gas fired reel oven for 20 minutes at 435° F. After baking the two loaves of bread, resulting from each test dough, were depanned and placed two inches apart on wire racks to cool for 45 minutes. When the cooling cycle was completed, loaf volumes were measured by the rapeseed displacement method and the loaves were stored in moisture resistant plastic bags for 48 hours at room temperature.

After the storage period, the two loaves of bread, resulting from each test dough, were placed in a miter box and sliced into two inch sections. Compressibility measurements of three sections were made using a Universal Penetrometer fitted with a cylindrical plunger 3 cm in diameter and weighing 265 grams. The plunger was adjusted to touch, but not press, the crumb surface of each section of bread, and the weight was released for ten seconds, locked, and the deformation reading taken from a dial calibrated in 0.1 mm. Three sections from each loaf (excluding heels) were used and the six (6) compressibility readings are averaged for each test dough. Softer loaves are indicated by the higher compressibility values. The bread was then assigned a quality rating ranging from 82 to 87 by scoring for volume, symmetry, crust color, break and shred, crumb color, grain, texture and eating quality. A score of 85 or above is considered premium quality. Small differences in quality scores can be significant if the data covers a large number of bakes and the trends are constant.

Seven specific triplicate test doughs were produced by the outlined method. These doughs contained specific additives as listed below, with the respective additives being added to the doughs by conventional means prior to baking thereof. The results of this series of tests are recorded in Table IX:

TABLE IX

| Dough No. | Additive | % Additive | Compressibility | Volume | Loaf Score |
|---|---|---|---|---|---|
| 1 | CSL | 0.5%[3] | 150 | 2846 | 84.67 |
| 2 | CSL + MG[1] | 0.5% + 0.1% | 151 | 2813 | 84.83 |
| 3 | CSL + MG | 0.5% + 0.2% | 158 | 2828 | 84.67 |
| 4 | CSL + MG | 0.5% + 0.3% | 166 | 2825 | 84.83 |
| 5 | CSL 7 MG | 0.5% + 0.4% | 162 | 2796 | 84.67 |

TABLE IX-continued

| Dough No. | Additive | % Additive | Compressibility | Volume | Loaf Score |
|---|---|---|---|---|---|
| 6 | CSL - SSL[2] | 0.5% | 168 | 2946 | 85.50 |
| 7 | None-Control | — | 118 | 2792 | 84.17 |

[1]MG (mono-and diglyceride) product used in each case was a commercially available MG sold under the Trademark "HiQ".
[2]CSL - SSL product in accordance with the present invention made with 50% CSL, 50% SSL coheated to melt the mixture, followed by cooling and grinding to a powder.
[3]All weights given in terms of baker's weight.

A review of the above data demonstrates that the additive of the invention (No. 6) gave the best results in terms of compressibility (bread softness), loaf volume and bread score. Since monoglycerides are sometimes used in addition to CSL as softness supplements, a comparison of such combinations was included versus the CSL-SSL (No. 6) product of the invention. These data show that 0.5% of the CSL-SSL co-melted combination produced more softness, loaf volume and better score than any of the 0.5% CSL combinations with various levels of monoglycerides. This demonstrates that the CSL-SSL product is effective at lower levels of use and therefore permits commensurate economies while producing superior organoleptic properties in the finished product.

EXAMPLE IV

In this example two separate sets of additives in accordance with the present invention were prepared. In one set mono-and diglycerides, and distilled monoglycerides were used with the basic CSL-SSL additives. In preparative procedures, the SSL, CSL and additional bread improver (i.e., mono-and diglycerides, distilled monoglycerides or succinylated monoglycerides) were admixed in a powdered condition and coheated in order to melt the respective components. These components were thoroughly commingled in the molten state, and the product was then allowed to solidify. The final step involved treating by grinding and screening the product to give a free flowing powder. The caking tests were conducted as set forth in Example I, in order to determine the susceptibility of the respective products to lumping. The results of these tests are given in the following Tables:

TABLE X

| SAMPLE COMPOSITION (Parts by Weight) | | | | ELAPSED STORAGE TIME IN DAYS (At 104° F.) | | | |
|---|---|---|---|---|---|---|---|
| CSL | SSL | [1]MG | [2]DMG | 6 | 9 | 16 | 22 |
| 100 | — | — | — | 3 | 4 | 4 | 8 |
| — | 100 | — | — | 2 | 3 | 7 | 8 |
| — | 62.5 | 37.5 | — | 2 | 4 | 6 | 6 |
| — | 62.5 | — | 37.5 | 4 | 5 | 7 | 8 |
| — | 62.5 | 25 | 12.5 | 4 | 3 | 5 | 7 |
| — | 62.5 | 12.5 | 25 | 5 | 5 | 6 | 8 |
| 70 | 30 | — | — | 1 | 1 | 1 | 1 |
| 59.5 | 25.5 | 15 | — | 1 | 1 | 2 | 2 |
| 49 | 21 | 30 | — | 2 | 2 | 2 | 3 |
| 38.5 | 16.5 | 45 | — | 2 | 2 | 2 | 3 |
| 59.5 | 25.5 | — | 15 | 2 | 2 | 2 | 2 |
| 49 | 21 | — | 30 | 2 | 2 | 3 | 3 |
| 38.5 | 16.5 | — | 45 | 2 | 2 | 3 | 3 |
| 49 | 21 | 20 | 10 | 3 | 2 | 3 | 4 |
| 49 | 21 | 15 | 15 | 3 | 3 | 3 | 3 |
| 49 | 21 | 10 | 20 | 2 | 3 | 3 | 3 |

[1]MG (mono-and diglycerides) product used was a commercially available product sold under the trademark ALDO-HMS.
[2]DMG (distilled monoglycerides) product used was a commercially available DMG product sold under the trademark Myverol-1800.

TABLE XI

| Sample Composition (Parts by Weight) | | | | | Elapsed Storage Time in Days (At 104° F.) | | | |
|---|---|---|---|---|---|---|---|---|
| CSL | SSL | [1]MG | [2]DMG | [3]SMG | 4 | 12 | 25 | 36 |
| 100 | — | — | — | — | 1 | 1 | 2 | 3 |
| — | 100 | — | — | — | 5 | 6 | 8 | 8 |
| 42 | 18 | 40 | — | — | 2 | 2 | 2 | 3 |
| 36 | 24 | 40 | — | — | 2 | 4 | 5 | 7 |
| 55 | 23 | — | 22 | — | 2 | 3 | 4 | 7 |
| 47 | 31 | — | 22 | — | 3 | 4 | 6 | 7 |
| 39 | 39 | — | 22 | — | 4 | 5 | 6 | 9 |
| 48 | 21 | 20 | 11 | — | 3 | 4 | 4 | 6 |
| 41 | 28 | 20 | 11 | — | 2 | 5 | 5 | 7 |
| 34.5 | 34.5 | 20 | 11 | — | 2 | 3 | 3 | 3 |
| 52.5 | 22.5 | — | — | 25 | 3 | 4 | 4 | 4 |
| 45 | 30 | — | — | 25 | 4 | 4 | 5 | 5 |
| 37.5 | 37.5 | — | — | 25 | 4 | 4 | 5 | 5 |
| 70 | 30 | — | — | — | 1 | 1 | 1 | 2 |
| 60 | 40 | — | — | — | 1 | 1 | 1 | 1 |
| 50 | 50 | — | — | — | 1 | 1 | 2 | 2 |
| — | 75 | — | — | 25 | 8 | 9 | 9 | 10 |
| — | 62.5 | 37.5 | — | — | 3 | 4 | 7 | 8 |

[1]MG (mono-and digylcerides) product used was a commercially available product sold under the trademark ALDO-HMS.
[2]DMG (distilled monoglycerides) product used was a commercially available DMG product sold under the trademark Myverol-1800.
[3]SMG (succinylated monoglyceride) product used is commercially available from Eastman Chemical Products, Inc., Kingsport, Tennessee.

As will be seen from the foregoing data, addition of supplemental dough improvers to the basic SSL-CSL additive generally resulted in some increase in the tendency to cake, but nevertheless the results clearly demonstrate that such additional dough improvers can be used in the present invention. In certain cases the most significant improvements were achieved during the early stages of testing; however, all of the tests gave some degree of improvement.

EXAMPLE V

The purpose of this test was to demonstrate the fact that cosynthesis of sodium and calcium salts produces an acceptable final product. In general, the synthesis method described in U.S. Pat. No. 2,733,252 was employed in this test. The proper proportions of lactic and stearic acid were first mixed together in a reaction vessel according to the above patent, in appropriate quantities to produce stearoyl-2-lactylates. Sodium and calcium neutralizing agents were included in the mix in the necessary proportions to produce salt mixtures as set forth in the following Table XII. The reaction was carried out at temperatures within the range of 180°–210° C. as is conventional. The reactions were considered complete when the acid value of the product had decreased to a level of about 55–70. The cosynthesized salt and calcium salts were allowed to cool and solidify to room temperature, whereupon they were ground in a comminuting mill and screened.

These co-synthesized products were then subjected to a caking test as described in Example I, using an ambient temperature of 105° F. These results are tabulated below:

TABLE XII

| SAMPLE COMPOSITION[1] | | ELAPSED STORAGE TIME IN DAYS (At 105° F.) | | | | |
|---|---|---|---|---|---|---|
| CSL | SSL | 4 | 8 | 15 | 22 | 36 |
| 10 | 90 | 4 | 5 | 6 | 8 | 9 |
| 20 | 80 | 3 | 4 | 4 | 4 | 8 |
| 30 | 70 | 2 | 2 | 2 | 3 | 6 |
| 40 | 60 | 1 | 1 | 1 | 1 | 2 |
| 50 | 50 | 1 | 1 | 1 | 1 | 2 |
| 60 | 40 | 1 | 1 | 1 | 1 | 2 |
| 70 | 30 | 1 | 1 | 1 | 1 | 2 |
| 80 | 20 | 1 | 2 | 2 | 2 | 2 |
| 90 | 10 | 2 | 5 | 5 | 7 | 8 |
| — | 100 | 7 | 9 | 10 | 10 | 10 |
| 100 | — | 7 | 8 | 10 | 10 | 10 |

[1]Data given in parts by weight.

As can be seen from the foregoing, the cosynthesized product at substantially all levels of use gave a synergistically enhanced resistance to caking, as compared with the SSL and CSL controls.

Having thus described the invention, what is claimed as new and desired to be secured by Letters Patent is:

1. An anti-caking dough conditioning agent which consists essentially of from about 15% to about 90% by weight of the total of a sodium salt of the reaction product of stearic acid and lactic acid and from about 10% to about 85% by weight of the total of a calcium salt of the reaction product of stearic acid and lactic acid, said sodium and calcium salts having been commingled in a molten condition and thereafter cooled to a solid state.

2. The dough conditioning agent as set forth in claim 1 wherein said sodium salt comprises sodium stearoyl-2-lactylate.

3. The dough conditioning agent as set forth in claim 1 wherein said calcium salt comprises calcium stearoyl-2-lactylate.

4. The dough conditioning agent as set forth in claim 1 wherein said sodium and calcium salts are initially admixed as respective solids and then coheated for melting the salts and said commingling thereof in a molten condition.

5. The dough conditioning agent as set forth in claim 1 wherein said sodium and calcium salts are simultaneously synthesized in a common vessel and under conditions for forming the respective salts in a molten condition in order to effect said commingling thereof.

6. The dough conditioning agent as set forth in claim 1 wherein said salts are separately synthesized and thereafter commingled in a molten condition.

7. The dough conditioning agent as set forth in claim 1 wherein said calcium salt is present in an amount at least equal to the amount of said sodium salt.

8. The dough conditioning agent as set forth in claim 7 wherein said calcium salt is present at a level of from about 50 to 85% by weight.

9. The dough conditioning agent as set forth in claim 8 wherein said calcium salt is present at a level of from about 65 to 80% by weight.

10. The dough conditioning agent as set forth in claim 1 wherein said calcium salt is present at a level of 10 to 40% by weight.

11. The dough conditioning agent as set forth in claim 10 wherein said calcium salt is present at a level of from about 20 to 30% by weight.

12. The dough conditioning agent as set forth in claim 1 wherein said agent is in the form of a free-flowing powder.

13. The dough conditioning agent as set forth in claim 1 including an additional dough improver commingled with said sodium and calcium salts in a molten condition and taken from the group consisting of mono-and diglycerides and derivatives thereof.

14. A method of preparing an anti-caking dough conditioning agent which consists essentially of the steps of:
commingling respective quantities of from about 15% to about 90% by weight of the total of a sodium salt of the reaction product of stearic acid and lactic acid and from about 10% to about 85% by weight of the total of a calcium salt of the reaction product of stearic acid and lactic acid; and
cooling the commingled molten salts to a solid state.

15. The method as set forth in claim 14 wherein said sodium salt comprises sodium stearoyl-2-lactylate.

16. The method as set forth in claim 14 wherein said calcium salt comprises calcium stearoyl-2-lactylate.

17. The method as set forth in claim 14 including the steps of initially admixing said salts as respective solids, and then coheating the same for melting of the solids and commingling thereof.

18. The method as set forth in claim 14 including the step of simultaneously synthesizing said salts in a common vessel under conditions for forming the respective salts in a molten condition.

19. The method as set forth in claim 14 including the steps of separately synthesizing said salts in a molten condition, and thereafter commingling the salts in said condition.

20. The method as set forth in claim 14 wherein said calcium salt is present in an amount of from about 50 to 90% by weight, based upon the weight of said sodium and calcium salts taken as 100%.

21. The method as set forth in claim 20 wherein said calcium salt is present in an amount at least equal to the amount of said sodium salt.

22. The method as set forth in claim 21 wherein said calcium salt is present at a level of from about 50 to 85% by weight.

23. The method as set forth in claim 22 wherein said calcium salt is present at a level of from about 65 to 80% by weight.

24. The method as set forth in claim 20 wherein said calcium salt is present at a level of from about 10 to 40% by weight.

25. The method as set forth in claim 24 wherein said calcium salt is present at a level of from about 20 to 30% by weight.

26. The method as set forth in claim 14 including the step of treating the cooled, solidified salts to put the same in powdered condition.

* * * * *